(12) United States Patent
Peloquin

(10) Patent No.: US 6,803,670 B2
(45) Date of Patent: Oct. 12, 2004

(54) METHOD AND APPARATUS FOR GENERATING ENERGY

(76) Inventor: Jean Victor Peloquin, 280 Chrisalta Way, Anaheim, CA (US) 92807

( * ) Notice: Subject to any disclaimer, the term of this patent is extended or adjusted under 35 U.S.C. 154(b) by 0 days.

(21) Appl. No.: 10/151,365

(22) Filed: May 20, 2002

(65) Prior Publication Data

US 2003/0214135 A1 Nov. 20, 2003

(51) Int. Cl.[7] .................................... F03B 13/12
(52) U.S. Cl. .................. 290/53; 290/42; 290/43; 290/53; 60/497
(58) Field of Search ................. 290/53, 54, 42, 290/43; 60/495, 497

(56) References Cited

U.S. PATENT DOCUMENTS

| | | | | |
|---|---|---|---|---|
| 1,058,785 A | * | 4/1913 | Nevers | 60/496 |
| 3,668,412 A | * | 6/1972 | Vrana et al. | 290/53 |
| 4,083,186 A | * | 4/1978 | Jackson, Sr. | 60/325 |
| 4,103,490 A | * | 8/1978 | Gorlov | 60/398 |
| 4,207,741 A | * | 6/1980 | Rainey | 60/496 |
| 4,260,901 A | | 4/1981 | Woodbridge | |
| 4,324,099 A | * | 4/1982 | Palomer | 60/497 |
| 4,425,510 A | * | 1/1984 | Jury | 290/42 |
| 4,599,857 A | * | 7/1986 | Kim et al. | 60/495 |
| 4,720,976 A | * | 1/1988 | Kim et al. | 60/495 |

FOREIGN PATENT DOCUMENTS

JP    2001082317 A  *  3/2001  ............. F03G/7/00

* cited by examiner

Primary Examiner—Joseph Waks
(74) Attorney, Agent, or Firm—Terrell P. Lewis

(57) ABSTRACT

Disclosed is an apparatus and method for generating energy, and in particular electrical energy, using fluid supported bodies, each disposed in one of a plurality of chambers filled with a fluid. The fluid, which issues from a fluid source, has a density which is greater than the body so that the bodies are all buoyant, and therefore float, in the fluid. A rotatable shaft is supported above the chambers, with each of said bodies being coupled to the shaft through a clutch mechanism for driving the shaft in rotation. An electrical energy-generating device may be coupled to the shaft for generating electrical energy when the shaft rotates. Conduits interconnect the chambers with the fluid source, and fluid level sensors and valve means communicating with the conduit means and the chambers for regulating ingress and egress of fluid from the chambers. The fluid in each of the chambers is selectively evacuated whenever the body in the respective chamber has been lifted to a preselected height within the chamber. The rate of evacuation of the fluid is greater than the rate of descent of the body so that after the fluid has been evacuated from the chamber, the body experiences "controlled" free fall and in so doing it turns the rotatable shaft. The series of bodies falling in the chambers is timed so that at any time, there is at least one body experiencing "controlled" free fall in free space.

19 Claims, 2 Drawing Sheets

METHOD AND APPARATUS FOR GENERATING ENERGY

BACKGROUND OF THE INVENTION

1. Field of the Invention

The present invention relates generally to the production of energy, and more particularly to a method and apparatus for producing energy, such as electricity, in which kinetic energy is converted to useful, energy producing, work. The apparatus of the invention provides for utilization of a natural energy source, preferably a renewable natural energy source, to rotatably drive shafts coupled to one or more generators so that electricity is produced on a continuous basis.

2. Description of the Related Art

The prior art is replete with teachings of devices and methods for producing power using renewable natural energy sources, such as solar power, geothermal power, tidal wave energy, and wind. Also, there are many teachings of machines that will convert gravitational potential energy into kinetic energy, as by using objects that fall onto and move receptacles attached to a rotatable shaft.

The prior art also teaches that it is well known to provide floatation devices, such as buoys or floats, to take advantage of fluid displacement and then to convert into work the upward thrust realized upon release of a submerged body (see for example U.S. Pat. No. 3,668,412 to Vrana et al., U.S. Pat. No. 4,425,510 to Jury, and U.S. Pat. No. 4,260,901 to Woodbridge all of which disclose apparatus for harnessing ocean tides in such a manner as to convert the energy associated with the rising and falling motion of the tides to useful power.

There is therefore a great and long-felt need for an electricity generating apparatus which converts the kinetic energy of bodies falling under the influence of gravity into useful work.

Against this background of known similar technology, the applicant has developed an electricity generating apparatus which converts the kinetic energy of falling bodies into useful energy. The energy generating apparatus of the invention further includes a plurality of modular units containing a multitude of fluid supported bodies possessing potential energy which are connected to a common generator shaft so that kinetic energy of the bodies created when the bodies are released for "free-fall" can be converted to rotational energy to drive the generator shaft in rotation. Additionally, it is contemplated that the modular units of the invention can be arranged in an array in such a manner that they are all connected through the common shaft to one or more generators.

SUMMARY OF THE INVENTION

The present invention provides an apparatus and method for extracting energy through the generation of work from kinetic energy of bodies that are constrained for "controlled" (i.e., tethered) free-fall motion. In addition, the invention provides an apparatus and method for converting extracted energy into useful work, and in particular converting useful work into generated electricity.

As used herein, "controlled" free-fall motion refers to the falling motion of a body that is attached to a rotatable shaft via a tether which, while under tension, exerts no appreciable force on the falling body to prevent the falling motion of the body. Further, as used herein, "controlled" free-fall motion refers to the motion of the body falling solely under the force of gravity while being tethered to and causing rotation of the rotatable shaft located above the falling body. The weight of the tether is so negligible relative to the weight of the body that, even though the tether is constantly maintained in tension between the falling body and its point of connection to the rotatable overhead shaft, the body essentially experiences no restraining force other than a virtually miniscule tension in the tether as the body falls downwardly. Thus, the falling body essentially experiences free-fall motion.

In one aspect of the present invention, there is provided a modular unit having a plurality of outer containers, each of which houses an inner container capable of exhibiting buoyancy in a column of fluid, preferably water. The fluid in the outer containers is introduced thereinto and removed therefrom in accordance with preselected parameters and in such a manner that, when the level of fluid in a first one of the outer containers is substantially at the top of the container, the level of fluid in a second outer container is substantially smaller, e.g., at the bottom of thereof, and the level of fluid in the remaining outer containers is at levels other than and between the substantially filled top level and the substantially smaller "bottom" level. In accordance with programmable instructions carried out by electronic controls, at preselected times, valves located in conduits connecting the outer containers are actuated to cause the fluid in the outer containers to be redistributed, and as a result, the inner containers are allowed to undergo "controlled" free-fall in a specified sequence. Insofar as each inner container is connected to the overhead rotatable shaft via a tether, as the body falls, it causes rotation of the shaft, which in turn causes rotation of electrical current generating device.

In another aspect of the present invention, a method of generating electricity includes the steps of providing a plurality of containers, disposing a floating body in each of the containers, sequentially moving an amount of fluid into the containers in a predetermined manner such that the floating bodies are sequentially supported at predetermined levels on the surface of the fluid via pressure, timing and valve sensors and actuating mechanisms. The method entails attaching each of the bodies to an overhead rotatable shaft via a tether of negligible weight that allows downward motion of the body in the respective container which results in rotation of the shaft. The method further entails evacuating the fluid from sequential ones of the containers at a rate greater than the fall of the bodies so that the bodies then experience "controlled" free fall, that is, free fall motion that is unrestrained, yet tethered. With the shaft coupled to a power generator, the fluid in the containers is redistributed, resulting in the continuous generation of power output.

These and other aspects, advantages, and features of the present invention will become more apparent and better understood, as will equivalent structures which are intended to be covered herein, with the teaching of the principles of the invention in connection with the disclosure of the preferred embodiments thereof in the specification, claims and drawings, in which:

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a novel construction and method for generating electrical power by converting the kinetic energy of bodies experiencing "controlled" free fall into useful work.

Figure 1:
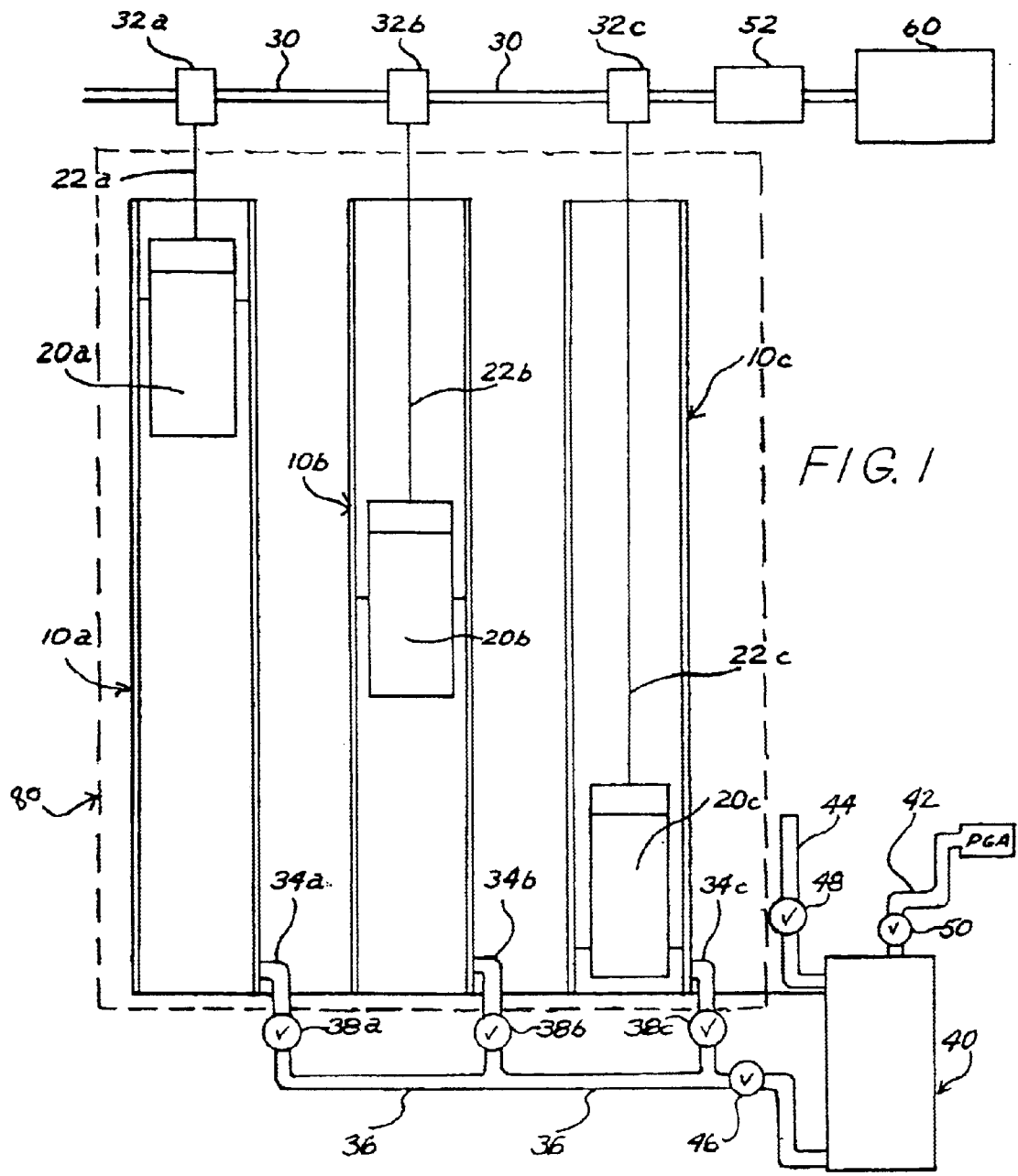
FIG. 1 illustrates, in side sectional view, the power generating apparatus of the present invention in accordance with a first embodiment of the apparatus.
Figure 2:
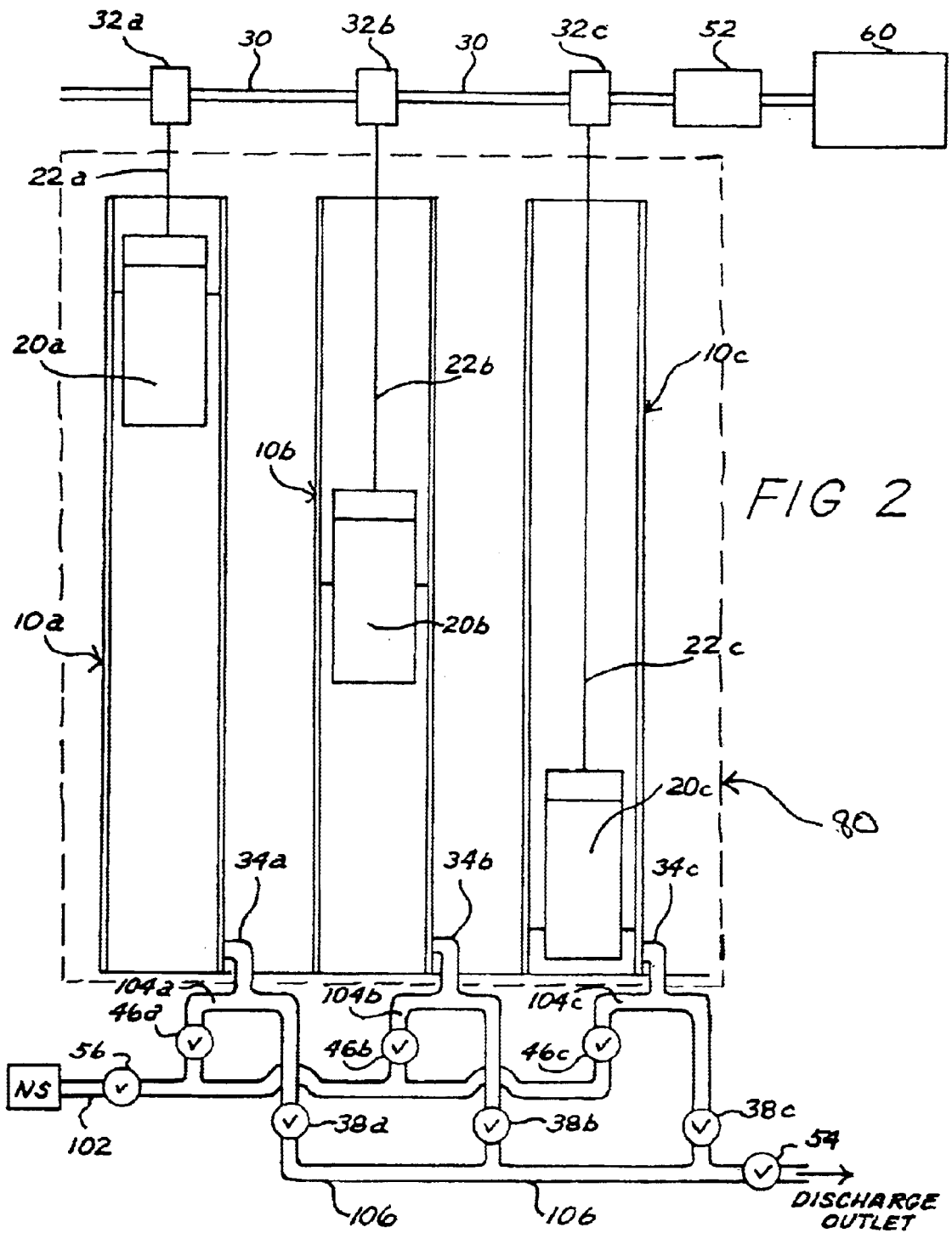
FIG. 2 illustrates, in side sectional view, the power generating apparatus of the present invention in accordance with a second embodiment of the apparatus.

Referring now to FIGS. 1 and 2 of the drawings, where like or similar reference numerals indicate the same or similar components in the two Figures, the invention is seen to include a plurality of outer containers or tanks 10a, 10b, 10c arranged in an array and capable of being filled with fluid, preferably water, from a source of fluid. The tanks may be situated relative to the source so that a head pressure head is developed before the fluid enters the tanks (FIG. 1), or alternatively, a pump may be used to fill the tanks from an available naturally-occurring fluid source (FIG. 2), such as a river or the sluice of a dam.

Each of the tanks is preferably substantially identical to one another, and may be formed from metal, concrete or plastic, depending on the application, and/or the site conditions, of the energy generating apparatus.

Positioned within each outer cylinder 10a, 10b, 10c is an inner container or tank 20a, 20b, 20c having its interior filled with a liquid, preferably water. Inner tanks 20a, 20b, 20c have a volume greater than the volume of liquid within the inner tank 20a, 20b, 20c to yield positive buoyancy. The invention contemplates that this substance can be air, air filled foam, or any other material that would allow positive buoyancy. While the tanks are shown in the Figures possessing a cylindrical shape, the tanks can also possess other shapes. In any event, it would be anticipated that due to hydrodynamic considerations, complimentary shapes for the tanks would be chosen to prevent any excessive water turbulence between the outer tanks 10a, 10b, 10c and the inner tanks 20a, 20b, 20c which could adversely affect the efficiency of the operation of the electrical generator.

Attached to the upper end of each inner tank 20a, 20b, 20c is an elongated tether member 22a, 22b, 22c which can be a chain, a rod, a cable, an articulated element, or any other mechanical attachment to the shaft 30. Each elongated member 22a, 22b, 22c is attached between the upper end of a respective inner tank 20a, 20b, 20c and a clutch mechanism 32a, 32b, 32c positioned on and mounted to the shaft 30 which extends substantially horizontally across the top of tanks 10a, 10b, 10c. The clutch mechanisms 32a, 32b, 32c are coupled to the tether members to convert the downward motion of the inner tanks 20a, 20b, 20c into a rotary motion of the shaft 30.

Fluid transfer pipes 34a, 34b, 34c extend from the lower end regions of adjacent tanks 10a, 10b, 10c to interconnecting pipes 36 extending between and coupling the fluid transfer pipes 34a, 34b, 34c. Valves 38 are positioned within each of the fluid transfer pipes 34a, 34b, 34c for starting and stopping the flow of fluid from and into the respective tanks 10a, 10b, 10c.

All of the fluid transfer pipes 34a, 34b, 34c are fluidly coupled via the interconnecting pipes 36 with a fluid source, which can be a natural source of fluid, a pressure tank, or a combination of both.

Where the fluid source comprises a pressure tank (shown at 40 in FIG. 1), a pressure supply conduit 42 and cut-off valve 50 will be provided to allow the interior of the pressure tank to be coupled to a pressure generating apparatus, such as a pump or compressor (designated with the reference symbol PGA in FIG. 1). The pressure tank 40 is also provided with a pressure release conduit 44 and a valve 48. Valves 48 and 50 are located outside the pressure tank 40 for a purpose to be described below in connection with the operation of the apparatus.

Where the fluid source comprises a natural source of fluid (shown at NS in FIG. 2), an inlet pipe 102 is fluidly coupled with the source NS, which by means of take-off conduits 104a, 104b, 104c is also fluidly coupled with the fluid transfer pipes 34a, 34b, 34d. A discharge pipe 106 is fluidly coupled with the inlet pipes 104a, 104b, 104c. Valve 56 is provided in the inlet pipe for selectively cutting the flow of fluid off to the outer containers when repair or maintenance is required. Valves 46a, 46b, 46c are provided in the conduits 104a, 104b, 104c upstream of the fluid transfer pipes 34a, 34b, 34c, respectively, and valves 38a, 38b, 38c are provided in the conduits 104a, 104b, 104c downstream of the fluid transfer pipes 34a, 34b, 34c, respectively to allow selective cut-off of the flow of fluid from the outer containers 10a, 10b, 10c throughout the cycles of operation as described below. A cut-off valve 158 is provided at the discharge end of the conduit 108.

Various elements similar to those detailed above, that is any elements composed of an outer tank and a buoyant inner tank, may be arranged in a battery configuration, with all of them acting in concert on the rotating shaft through a respective clutch mechanism associated with each tank. While FIG. 1 shows a configuration with three tanks situated in a row or array 80, it is to be understood that a principal aim of this invention is to provide continuous generation of electricity using any number of tank assemblies (it is to be understood that each tank assembly includes an inner tank and an outer tank, with associated pipes and valves) in an array 80, as long as there are at least two tank assemblies. Further, two or more tank assembly arrays 80 may be arranged in series or in parallel and can be operated all as an electricity generating system to increase the operating efficiency of the generating system, or to increase the generating capacity of the system.

The shaft 30 may be connected to an electricity generating apparatus 60 or any other energy conversion device. A gearbox 52 may be connected via the shaft 30 disposed on opposite sides of the gearbox 52 to apparatus 60 to step up or step down the number of rotations of the shaft 30, depending on the intended use of the output of the system.

The opening and closing of valves for the intake and output of fluid into and from the respective outer tanks 10a 10b, 10c, ... is automatically achieved using fluid detecting sensors electronically coupled to the valves, with the sensors being located along the outer surface of the outer tanks.

The fluid in the outer tanks of the apparatus of the present invention can be replenished from a source of freely obtainable fluid capable of generating a head pressure (e.g., from a reservoir, lake, or other naturally occurring source of fluid such as a geyser). Alternatively, the fluid in the outer tanks can be replenished from a container of the fluid which is pressurized. Using water as the fluid, in the first case, replenishment can be accomplished by directing the fluid from a source of free flowing water having a head pressure greater than that needed to raise the level of fluid in the outer tanks to the upper extremity of the outer tanks, while in the second case, a pressure vessel is used to cause the fluid to refill the outer tanks to requisite levels.

Operation of the apparatus of the present invention is now described with reference to FIGS. 1 and 2 as noted below. The following description is based on an array of three outer tanks 10a, 10b, 10c and will, for ease of description, be described in terms of three cycles of operation (cycle I, cycle II, and cycle III) which are repeated over and over, ad finitem, from the start of operation of the apparatus until termination of operation of the apparatus which may occur when maintenance or replacement of components is required.

Referring now to FIG. 1, the operation of the inventive apparatus is described where the water comes from free flowing water having a head pressure greater than the pressure at the top of the tanks 10a, 10b, 10c.

Prior to initiation of cycle I, the outer tank 10a is filled with water to a level near the top of the tank so that the buoyant tank 20a floats at that level within the outer tank 10a. The outer tank 10b is partially filled with water and the buoyant tank 20b floats within the tank at the level of water in outer tank 10b. Outer tank 10c at this time is empty with the buoyant inner tank 20c resting on the bottom of the outer tank 10c.

Following setup of the apparatus, cycle I of operation of the apparatus is started by simultaneously opening valves 38a and 38b to allow water within outer tanks 10a and 10b to equalize. Allowing the water to evacuate from tank 10a faster than the rate at which the inner tank 20a can fall allows the full use of the kinetic energy descent y means of the connecting tether 22a to the clutch 32a and the rotating shaft 30. Shaft 30 rotates by means of the tethered descending weight allowing shaft 30 to be connected to an energy-using device, such as an electrical generator.

Upon equalization of tanks 10a and 10b, valve 38b is closed and valve 38c is opened simultaneously with the closing of valve 38b. This allows water within tanks 10a and 10c respective tanks to equalize. As the equalization takes place, valve 56 and valve 46b open simultaneously to permit free water to fill outer tank 10b to the top, carrying with the liquid the inner buoyant tank 20b to the top of the inner tank 10b. When the inner tank 20b reaches the top of the outer tank 10b, valves 46b and 56 close simultaneously. At this topmost position, the inner tank 20b is poised for initiation of cycle II of the operation of the three tank array, while the remainder of the inner tanks continue to proceed through cycle I of the operation of the array. Upon equalization of the water in outer tanks 10a and 10c, valve 38c closes simultaneously with the opening of valve 54 so that the remaining water from the outer tank 10a drains to the discharge outlet associated with outer tank 10a.

When the outer tank 10a is fully drained, valve 38a and valve 54 close simultaneously. When the inner tank 20a reaches the bottom of the outer tank 10a, cycle II of the process begins. This prevents the rotating shaft 30 from stopping its rotation, thereby allowing for continuous power generation.

Cycle II starts with the simultaneous opening of valves 38b and 38c. This permits water in outer tank 10b to be evacuated therefrom, while permitting the water in the two tanks 10b and 10c to become equalized. The evacuation of water from outer tank 10b at a rate faster than the inner tank 20b can fall permits the tethered inner tank 20b to cause rotation of the rotatable shaft 30. Upon equalization of the water in tanks 10b and 10c, valve 38c closes simultaneously with the opening of valve 38a.

As this equalization occurs, valve 56 and valve 46c open simultaneously allowing free water to fill tank 10c to the top carrying with it the inner tank 20c to the top of outer tank 10c. Upon arrival of the inner tank 20c to the top, valve 46c and valve 56 close simultaneously. This position now sets the inner tank 20c for the beginning of cycle III while continuing to completion of cycle II. Upon equalization of tanks 10c and 10a, valve 38a closes with the simultaneously opening of valve 54 to allow the remaining water in tank 10b to drain to the discharge outlet. When the tank 10b is fully drained, valve 38a and valve 54 close simultaneously. When the inner tank 20b reaches nearly to the bottom of outer tank 10b, then cycle III begins, and the rotating shaft 30 continues to be driven in rotation, thereby allowing continuous power generation.

Upon starting cycle III, valves 38a and 38c open simultaneously to permit water within their respective tanks to equalize. Allowing water to evacuate from tank 10c causes the tethered bouyand tank 20c to transfer the power stroke from near to the bottom buoyant/weighted tank 20b uninterrupted allowing continuous rotation of shaft 30.

Upon equalization of tanks 10a and 10c, valve 36a closes and valve 36b opens simultaneously allowing water to flow into their respective tanks and equalize. As this equalization occurs, valve 56 and valve 46a open simultaneously to allow free water to fill tank 10a to the top carrying with it the buoyant/weighted inner tank 20a to the top of the outer tank 10a. This position now sets the stage for the beginning of cycle I, as previously described, while continuing through the end of cycle III.

Upon equalization of tanks 10c and 10b, valve 38b closes and valve 54 opens simultaneously allowing the remaining water in tank 10c to drain into the discharge outlet. When tank 10c is fully drained, valve 38c and 54 close simultaneously.

When the falling inner tank 20c reaches the bottom of its outer tank 10c, cycle I will again be started so as to prevent the rotating shaft 30 from stopping, thereby facilitating continuous rotation of the shaft.

Referring now to FIG. 2, in which the water is provided by a pressurized source, operation of the apparatus entails first preparing the tanks by filling the outer tank 10a with water almost to the top of the tank so that the buoyant inner tank 20a floats on the water within the outer tank 10a, filling the second outer tank 10b partly with water so that the buoyant tank 20b floats within tank 10b at that level, and leaving the outer tank 10c substantially empty with the buoyant tank 20c resting on the bottom of outer tank 10c.

Upon initiating operation of the apparatus (i.e., at the start of cycle I), valves 38a and 38b are opened simultaneously to allow water within tanks 10a and 10b to equalize (i.e., to reach the same level). By allowing the water to be evacuated from tank 10a at a rate of speed greater than the falling buoyant tank 20a, the full effect of the kinetic energy associated with the inner tank 20a as it descends can be harnessed to drive the rotatable shaft 30 in rotation. This is accomplished through the tether 22a which rotatably connects the tank 20a to the clutch 32a and hence the shaft 30. The shaft 30 rotates and in turn causes the transfer of energy from the rotating shaft to an energy-using device such as an electrical generator.

When the level of the water in the outer tanks 10a and 10b are equal, valve 38b closes simultaneously with the opening of valve 38c, thereby allowing water, remaining in tank 10a after equalization of the level of water in tanks 10a and 10b, to continue to drain out of tank 10a. When the level of water in tank 10a reaches the level of water in tank 10c, valve 38c is closed and valve 46 is opened to allow the water remaining in the outer tank 10a to drain into the pressure vessel 40.

When outer tank 10a is fully drained valve 38a closes, and valve 38b opens, while valve 48 closes simultaneously with the opening of valve 50, the latter two valves cooperating to allow pressure vessel 40 to be subjected to pressurize from a source (not shown) thereby forcing water from pressure vessel 40 to the outer tank 10b to fill that outer tank to the top carrying with it the buoyant inner tank 20b. When the inner buoyant tank 20b reaches the top of the outer tank 20a, valve 38b closes, valve 46 closes, valve 48 opens and valve 50 closes simultaneously. This now sets the apparatus of the invention up for initiation of cycle II of the process. When the falling inner tank 20a reaches very nearly the bottom of tank 10a, then cycle II begins so as to prevent the cessation of rotation of the shaft 30, thereby facilitating continuous power generation.

Upon starting cycle II, valves 38b and 38c are opened simultaneously to allow water within tanks 10b and 10c to equalize, that is reach the same level. By allowing the water to be evacuated from tank 10b at a rate of speed greater than the falling buoyant/inner tank 20b, the kinetic energy of inner tank 20b as it descends is effectively harnessed to drive the rotatable shaft 30 in rotation. This effect is accomplished through the connection of the inner tank 20b to the clutch 32b via tether 22b. The shaft 30 is caused to rotate and in turn causes the transfer of energy from the rotating shaft 30 to an energy-using device, such as the electrical generator referred to above in connection with the description of cycle I.

When the level of the water in the outer tanks 10b and 10c are equal, valve 38c closes simultaneously with the opening of valve 38a, thereby allowing water, remaining in outer tank 10b after equalization of the level of water in tanks 10b and 10c, to continue to drain out of tank 10b. When the level of water in tank 10b reaches the level of water in tank 10a, valve 38a is closed and valve 46 is opened to permit the water remaining in the outer tank 10b to drain into the pressure vessel 40.

When tank 10b is fully drained, valve 38b closes, valve 38c opens simultaneously with the closing of valve 48. Further, valve 50 opens to allow pressure vessel 40 to be pressurized thereby forcing water from the pressure vessel 40 to tank 10c filling the tank to the top and carrying the buoyant inner tank 20c to the top of the outer tank 10c. When tank 20c reaches the top of tank 10c, valve 38c and valve 46 close, and valve 48 opens simultaneously with the closure of valve 50. This sequence of steps now sets the apparatus of the invention up for cycle III of the process. When the falling inner tank 20b reaches very nearly the bottom of tank 10b, then cycle III begins so as to prevent the rotating shaft 30 from stopping, thereby facilitating continuous power generation.

Upon starting cycle III, valves 38a and 38c are opened simultaneously to allow water within tanks 10a and 10c to equalize. By allowing the water to be evacuated from tank 10c at a rate of speed greater than the falling buoyant inner tank 20c, the kinetic energy of inner tank 20c as it descends is effectively harnessed to drive the rotatable shaft 30 in rotation This is accomplished through the connection of the inner tank 20c to the clutch 32c via tether 22c. The shaft 30 is caused to rotate and in turn causes the transfer of energy from the rotating shaft 30 to the electrical generator referred to above.

Upon equalization of the level of water in tanks 10a and 10c, valve 38a closes simultaneously with the opening of valve 38b to allow the level of water within tanks 10c and 10b to equalize. Once equalization has been achieved, valve 38b is closed, and valve 46 opens simultaneously with the opening of valve 48 allowing the remaining water within tank 10c to drain into the pressure vessel 40. When tank 10c is fully drained, valve 38c closes, valve 38a opens, valve 48 closes and valve 50 opens, all simultaneously, allowing pressure vessel 40 to be pressurized forcing water from pressure vessel 40 into tank 10a filling tank 10a to the top while carrying with it inner tank 20a to the top of tank 10a.

Upon arrival of buoyant tank 20a to the top of tank 10a, valve 38a closes, simultaneously with the closing of valve 46, the opening of valve 48 and the closing of valve 50. This position now stages the apparatus for the beginning of cycle I again as previously described above.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. Apparatus for continuously generating energy, comprising:
    a plurality of outer chambers,
    fluid having a first density, said fluid being supplied from a fluid source, said fluid being contained in said chambers at different preselected heights,
    a body disposed within each of said chambers, each said body having a buoyancy in said fluid,
    a rotatable shaft supported above said chambers, each of said bodies being coupled to said shaft through a clutch mechanism for driving said shaft in rotation,
    an energy generating device coupled to said shaft for generating energy when said shaft rotates,
    conduit means interconnecting said chambers and said fluid source, said conduit means including valve means for selectively dosing various ones of said conduit means,
    fluid level sensors and valve means communicating with said conduit means and said chambers for regulating ingress and egress of fluid from said chambers,
    and control means for regulating motion of said bodies in said chambers so that at least one of the bodies is falling at any given moment.

2. The energy generating apparatus of claim 1, wherein the fluid in each of said chambers is selectively evacuated therefrom whenever the body in said chamber has been lifted to a preselected height within said chamber, said rate of evacuation of the fluid being greater than the rate of fall of the body in free space.

3. The energy generating apparatus of claim 1, and further including a gearbox coupled by said shaft to said energy generating device.

4. The energy producing apparatus of claim 1, wherein said energy comprises electrical energy, and further including an electrical energy output device coupled to said rotatable shaft for producing electrical energy when said shaft is driven in rotation.

5. Electrical energy generating apparatus, comprising:
    a plurality of energy generating arrays coupled in series, each of said arrays including
    a plurality of outer chambers,
    fluid of a first density and issuing from a fluid source, said fluid being contained in said chambers at different preselected heights,
    a body disposed within each of said chambers, each said body having a buoyancy in said fluid, a rotatable shaft supported above said chambers, each of said bodies being coupled to said shaft through a clutch mechanism for driving said shaft in rotation, an electrical energy generating device coupled to said shaft for generating electrical energy when said shaft rotates, conduit means interconnecting said chambers and said fluid source, said conduit means including valve means for selectively closing various ones of said conduit means, control means for regulating motion of said bodies in said chambers so that at least one of the bodies is falling at any given moment, and fluid level sensors and valve means communicating with said conduit means and said chambers for regulating ingress and egress of fluid from said chambers.

6. The apparatus of claim 5, wherein said rotatable shafts are coupled together.

7. A method of generating electrical energy using kinetic energy of buoyant bodies supported in fluid filled chambers, comprising:

filling the chambers with the fluid to different heights, said heights being chosen as a function of the number of chambers, at least one of said chambers being substantially filled, and at least one of the chambers being substantially empty, regulating the ingress and egress of said fluid relative to said chambers wherein said fluid is evacuated from said one chamber while being directed into the other chambers, coupling said bodies in said chambers to a rotatable shaft to drive said shaft in rotation when said bodies are falling so that said falling motion is controlled, and regulating motion of said bodies by coupling them via electronic control means such that at least one of the bodies is falling at any given moment.

8. The method of claim 7, wherein said step of regulating the ingress and egress of fluid relative to said chambers comprises actuating valve means based on electronic signals received from sensors detecting the position of said bodies within said chambers.

9. The method of claim 7, wherein said step of coupling said bodies to a rotatable shaft comprises attaching a tether between each said body and the shaft and coupling the tether to the shaft so that the tether drives the shaft in rotation.

10. The method of claim 7, and further including a source of fluid, said fluid comprising water.

11. The method of claim 10, wherein said source of fluid comprises a reservoir from which said water is drawn.

12. The method of claim 11, wherein said reservoir comprises a pressurized source of fluid.

13. The method of claim 10, wherein said source of fluid comprises a natural resource, such as a river, from which said water is drawn.

14. The method of claim 7, wherein said step of regulating motion of said bodies comprises providing valves and fluid-carrying conduits for each of said chambers and turning said valves on and off in a sequence which permits at least one of said bodies to be in falling motion at any time during operation of said apparatus.

15. The method of claim 7, wherein each of said chambers comprises a tubular element, and each of said bodies is cylindrical and is guided in its motion by the inner surface of said tubular element.

16. Apparatus for generating useful energy using kinetic energy of buoyant bodies supported in fluid filled chambers, comprising:

means for filling the chambers with the fluid to different heights, said heights being chosen as a function of the number of chambers, at least a first one of said chambers being substantially filled and at least one of said chambers being substantially empty, means for regulating the ingress and egress of said fluid relative to said chambers wherein said fluid is evacuated from said first chamber while being directed into the other chambers, means for coupling said bodies in said chambers to a rotatable shaft to drive said shaft in rotation when said bodies are falling so that said falling motion is controlled, and means for regulating the motion of said bodies by coupling them via electronic control means such that at least one of the bodies is falling at any given moment.

17. The apparatus of claim 16, wherein said means for regulating the ingress and egress of said fluid includes valve means and conduit means interconnecting said chambers and said valve means.

18. The apparatus of claim 17, wherein electronic sensors are positioned at selected locations on the chambers, said sensors detecting the position of said bodies within said chambers, and further including means for actuating said valve means based on electronic signals received from said sensors.

19. The apparatus of claim 16, wherein said means for coupling said bodies in said chambers to said rotatable shaft includes a tether attached between each body and the shaft so that movement of the bodies in the chambers drives said shaft in rotation.

\* \* \* \* \*